(12) United States Patent
Zhang

(10) Patent No.: US 8,038,477 B2
(45) Date of Patent: Oct. 18, 2011

(54) CARD CONNECTOR WITH A HOUSING WITH TWO COVERS RECEIVING TWO CARDS

(75) Inventor: Wei-De Zhang, Shenzhen (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/888,466

(22) Filed: Sep. 23, 2010

(65) Prior Publication Data

US 2011/0070760 A1 Mar. 24, 2011

(30) Foreign Application Priority Data

Sep. 23, 2009 (CN) .................. 2009 2 0311157.0

(51) Int. Cl.
*H01R 24/00* (2011.01)
(52) U.S. Cl. .................................................... 439/630
(58) Field of Classification Search .................. None
See application file for complete search history.

(56) References Cited

U.S. PATENT DOCUMENTS

| | | | |
|---|---|---|---|
| 7,029,306 B2 * | 4/2006 | Bilcauu et al. | 439/326 |
| 7,364,468 B2 * | 4/2008 | Liu et al. | 439/638 |
| 7,448,889 B1 * | 11/2008 | Ho et al. | 439/159 |
| 7,507,098 B1 * | 3/2009 | Hung | 439/159 |
| 7,530,852 B2 * | 5/2009 | Hu et al. | 439/630 |
| 7,556,534 B1 * | 7/2009 | Ho | 439/630 |
| 7,871,298 B2 * | 1/2011 | Guo et al. | 439/630 |
| 2009/0305567 A1 | 12/2009 | Lin et al. | |

FOREIGN PATENT DOCUMENTS

| | | |
|---|---|---|
| TW | M273858 | 8/2005 |
| TW | M295364 | 8/2006 |
| TW | M331802 | 5/2008 |
| TW | M377737 | 4/2010 |

* cited by examiner

*Primary Examiner* — Chandrika Prasad
(74) *Attorney, Agent, or Firm* — Ming Chieh Chang; Wei Te Chung; Andrew C. Cheng

(57) ABSTRACT

A card connector (100) for receiving two cards includes an insulative housing (1), a lower cover (5) disposed at one side of the insulative housing for defining a first card receiving space (102), an upper cover (4) disposed at an opposite side of the insulative housing for defining a receiving space, and a number of first contacts (2) and a number of second contacts (3) retained in the insulative housing. The receiving space includes a second card receiving space (101) and a third receiving space (103) sideways relative to the second card receiving space. The card connector further includes an ejector (6) which is assembled in the third receiving space. The ejector includes an ejecting portion (621) extending into the first card receiving space for ejecting one of the two cards.

18 Claims, 5 Drawing Sheets

CARD CONNECTOR WITH A HOUSING WITH TWO COVERS RECEIVING TWO CARDS

BACKGROUND OF THE INVENTION

1. Field of the Invention

The present invention relates generally to a card connector, and more particularly to a stacked card connector defining two spaces for receiving two cards while at the same time reducing a height thereof.

2. Description of Related Arts

A stacked card connector including a first card connector such as a SIM (Subscriber Identity Module) card connector and a second card connector such as an SD (Secure Digital Memory) card connector is widely used nowadays. The SD card connector usually comprises a push-push ejector for guiding/ejecting an SD card. However, a user inserts the SIM card in the SIM card connector and withdraws the SIM card out of the SIM card connector without an ejector. Because the SIM card connector is small in size and the SIM card is thin, it is rather inconvenient in withdrawing the SIM card by fingers.

U.S. Patent Application Publication No. 2009/0305567 published on Dec. 10, 2009 and having the same assignee as the present patent application discloses a SIM card connector which has an ejector for ejecting an inserted SIM card. The SIM card connector includes an insulative housing, a plurality of contacts received in the insulative housing, and an ejector assembled on the insulative housing. The insulative housing comprises a base portion defining a plurality of passageways for receiving the contacts, a pair of lateral walls extending upwardly from two edges of the base portion, and a rear wall extending upwardly from a rear edge of the base portion which is opposite to a front edge which guides an insertion of a card. The rear wall forms a protrusion on an upper surface thereof. The ejector comprises an operating lever extending along a card insertion direction and an ejecting lever extending along a transverse direction relative to the card insertion direction. The ejecting lever defines an aperture in a middle part thereof, and the ejecting lever is assembled on the insulative housing by securing the protrusion to the aperture. The ejecting lever pivotally rotates around the protrusion when the operating lever is operated. The ejecting lever then confronts the inserted card and ejects the card out of the card receiving space. The ejector is assembled on the upper surface of the insulative housing, which increases a height of the SIM card connector. When such a SIM card connector of U.S. Patent Application Publication No. 20090305567 is stacked on a SD card connector, the height of the stacked card connector is inevitably high.

Hence, a stacked card connector having a low height is desired to overcome the aforementioned disadvantage of the prior art.

SUMMARY OF THE INVENTION

Accordingly, an object of the present invention is to provide a stacked card connector having a low height.

To achieve the above object, a card connector for receiving two cards includes an insulative housing, a lower cover disposed at one side of the insulative housing for defining a first card receiving space, an upper cover disposed at an opposite side of the insulative housing for defining a receiving space, and a number of first contacts and a number of second contacts retained in the insulative housing. The receiving space includes a second card receiving space and a third receiving space sideways relative to the second card receiving space. The card connector further includes an ejector which is assembled in the third receiving space. The ejector includes an ejecting portion extending into the first card receiving space for ejecting one of the two cards.

Other objects, advantages and novel features of the invention will become more apparent from the following detailed description when taken in conjunction with the accompanying drawings.

DETAILED DESCRIPTION OF THE PREFERRED EMBODIMENT

Figure 1:
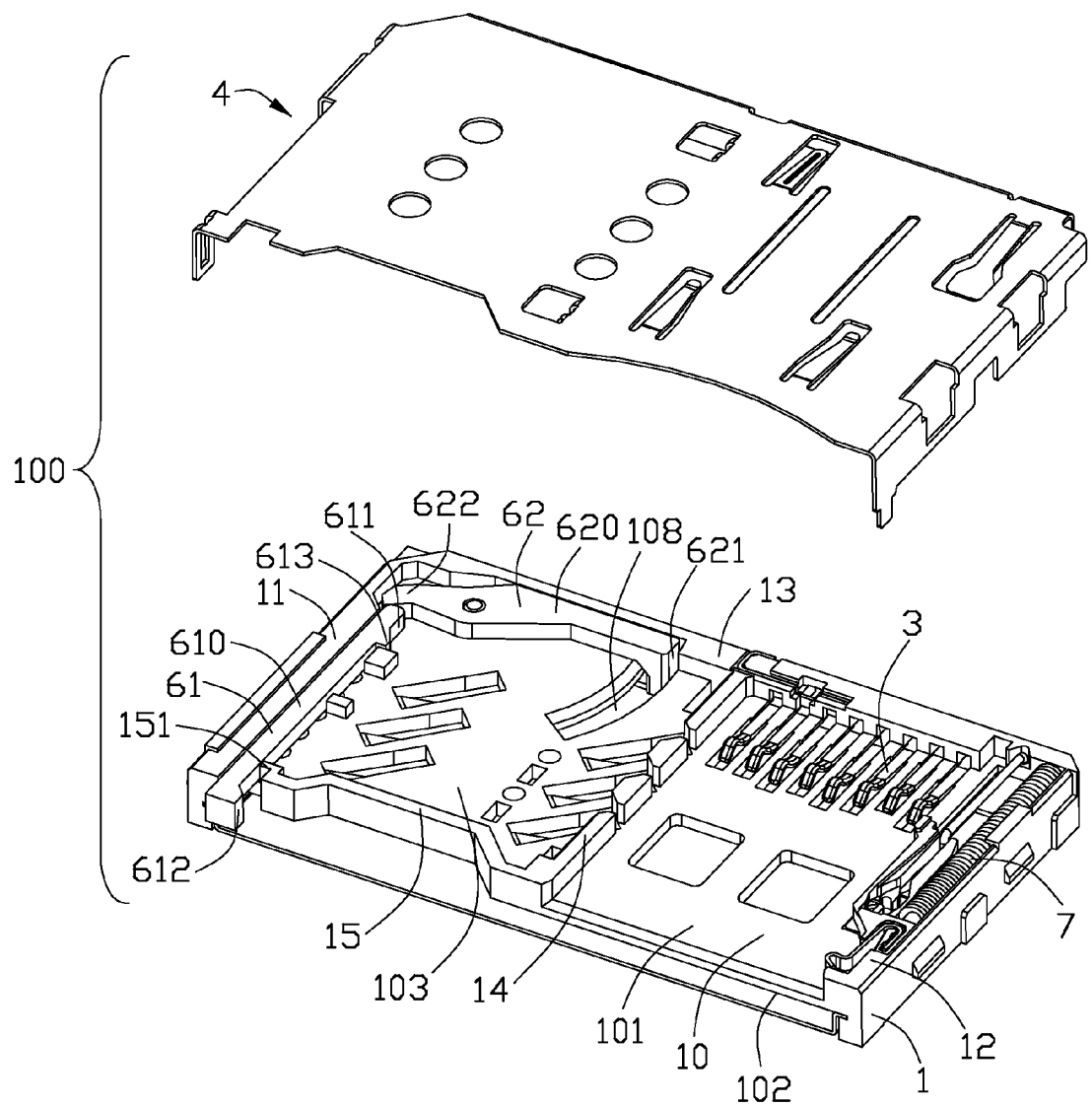
FIG. 1 is a perspective, partly exploded view of a card connector constructed in accordance with the present invention when an upper cover is separated from an insulative housing, and a first ejector is assembled on the insulative housing at a first position.

Reference will now be made in detail to the preferred embodiment of the present invention.

Referring to FIGS. 1-5, a card connector 100 in accordance with the present invention used for receiving both a SIM (Subscriber Identity Module) card 9 and a micro SD (Secure Digital) card (not shown), comprises an elongated insulative housing 1, a plurality of first contacts 2 and a plurality of second contacts 3 received in the insulative housing 1 for respectively connecting with the SIM card 9 and the micro SD card, a lower cover 5 assembled on the lower side of the insulative housing 1 for defining a first card receiving space 102, an upper cover 4 assembled on the upper side of the insulative housing 1 for defining a second receiving space (not labeled), and a first ejector 6 and a second ejector 7 both assembled on the insulative housing 1 for respectively ejecting the SIM card 9 and the micro SD card. The SIM card 9 and the micro SD card are inserted into their corresponding receiving spaces through different card inserting ports along a same card insertion direction.

Figure 2:
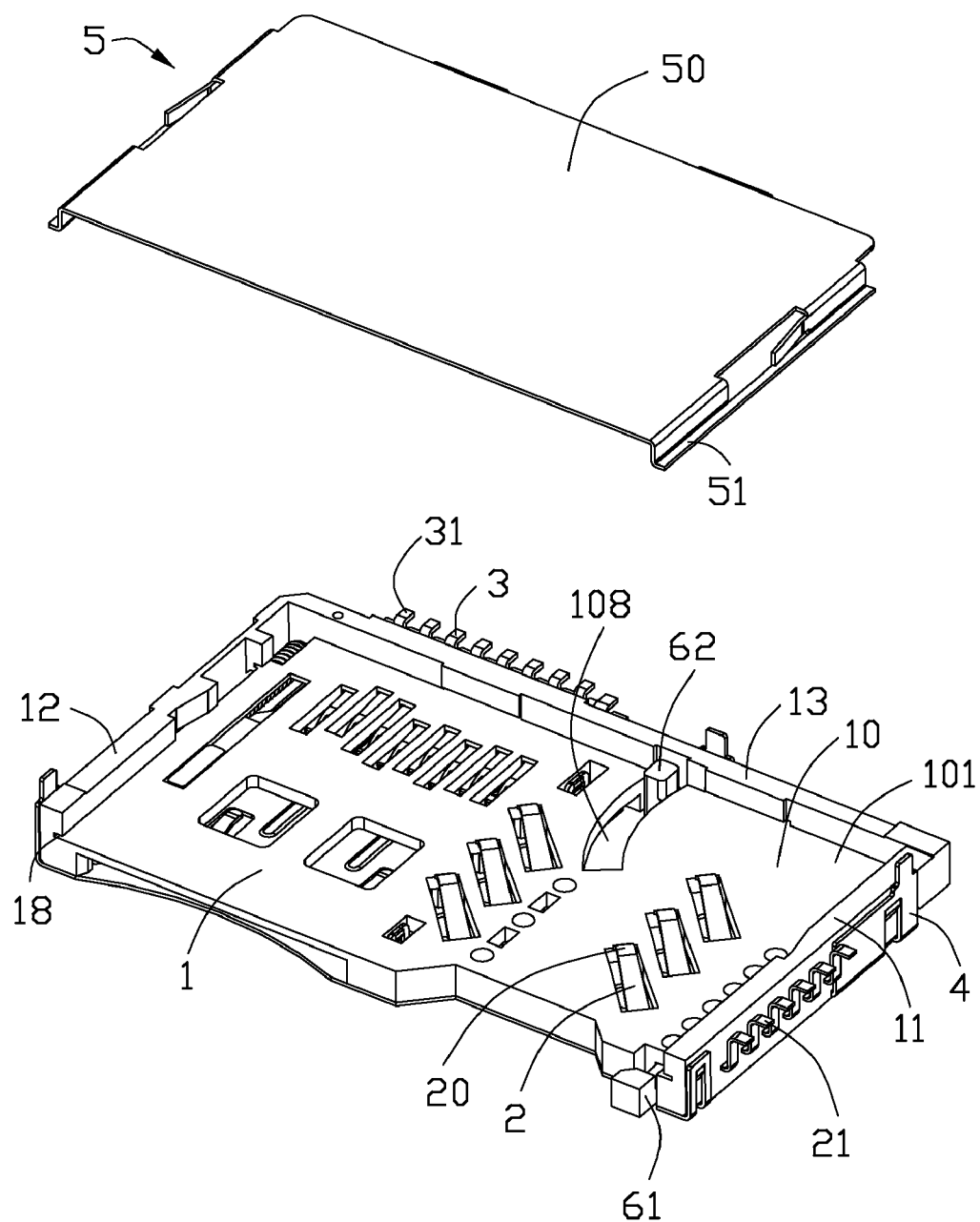
FIG. 2 is another perspective, partly exploded view of the card connector when a lower cover is separated from the insulative housing and the first ejector is located at the first position.
Figure 3:
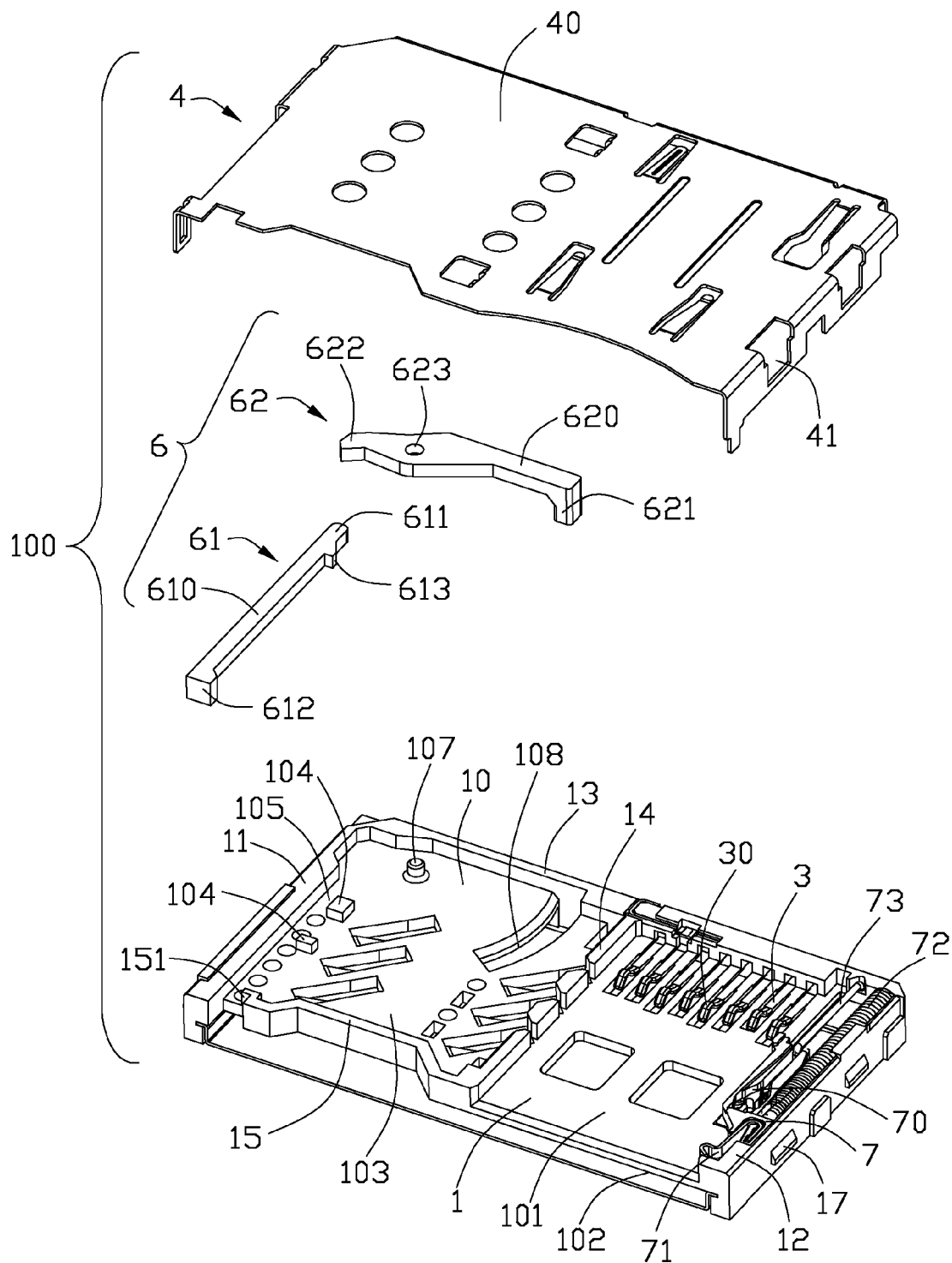
FIG. 3 is a perspective, exploded view of the card connector when the upper cover and the first ejector are both separated from the insulative housing.

Referring to FIGS. 1-3, the insulative housing 1 comprises a base portion 10, a left wall 11 and a right wall 12 extending upwardly from two lateral edges of the base portion 10, and a rear wall 13 extending upwardly from a rear edge of the base portion 10. The insulative housing 1 further comprises a barrier portion 14 extending across a middle part of the base portion 10 along the card insertion direction to divide the second receiving space into a left or third receiving space 103 and a right or second card receiving space 101. The insulative housing 1 further comprises a front wall 15 connecting to the front end of the barrier portion 14 and curvedly extending towards the left wall 11. The front wall 15 forms a stop portion 151 at a free end thereof, which is located adjacent to but spaces a little distance away from the left wall 11. The front wall 15 prevents the micro SD card from being mistakenly inserted into the left or third receiving space 103. In particular, the right or second card receiving space 101 is the micro SD card receiving space. The base portion 10 further forms a plurality of protrusions 104 protruding into the left or third receiving space 103, which are spaced same distances away from the left wall 11 as the stop portion 151 is spaced away from the left wall 11. Therefore, a receiving channel 105 is defined between the left wall 11 and the stop portion 151 and the protrusions 104. The base portion 10 further forms a column portion 107 protruding into the left or third receiving space 103 and located adjacent to the rear wall 13. The base portion 10 defines an arcuate slot 108 adjacent to the barrier portion 14. The arcuate slot 108 extends from the rear wall 13 and gradually moves farther away from the barrier portion 14. The arcuate slot 108 extends through upper and lower faces of the base portion 10. The left wall 11 and the right wall 12 each form a plurality of engaging portions 17 for engaging with the upper cover 4 fixedly. The left wall 11 and the right wall 12 each define a guiding slit 18 below the base portion 10, through which the lower cover 5 is inserted.

Referring to FIGS. 1-4, the first contacts 2 are received in the insulative housing 1 and partially extend into the first card receiving space 102 for connecting with the SIM card 9. The first contacts 2 comprise a plurality of first contacting portions 20 angularly positioned in the insulative housing 1 relative to the card insertion direction and a plurality of first soldering portions 21 extending outside of the insulative housing 1 through the left wall 11. The second contacts 3 are retained in the insulative housing 1 along a card ejection direction which is opposite to the card insertion's direction. The second contacts 3 comprise a plurality of second contacting portions 30 extending into the right or second card receiving space 101 of the second receiving space for connecting with the micro SD card and a plurality of second soldering portions 31 extending outside of the insulative housing 1 through the rear wall 13.

Referring to FIGS. 2-3, the upper cover 4 comprises a main portion 40 and a pair of vertical walls (not labeled) extending downwardly from two opposite edges of the main portion 40. Each vertical wall defines a plurality of cutouts 41 for mating with the engaging portions 17, and thereby the upper cover 4 is secured on the insulative housing 1. The lower cover 5 comprises a flat portion 50 and a pair of side portions 51 vertically and outwardly extending from the flat portion 50. The side portions 51 are inserted into the slits 18 so that the lower cover 5 is secured on the insulative housing 1.

Figure 4:
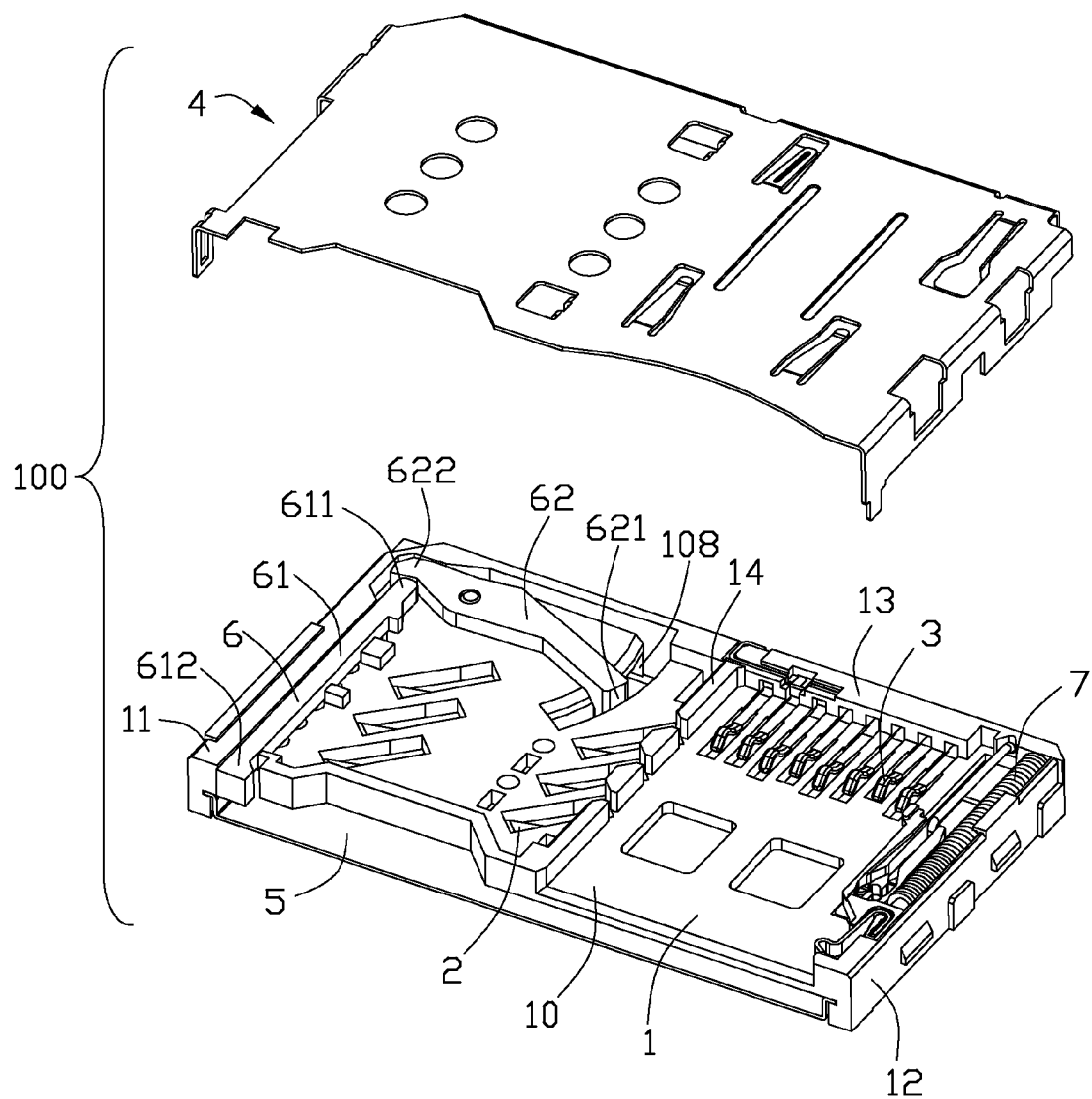
FIG. 4 is a view similar to FIG. 1 but the first ejector is located at a second position.
Figure 5:
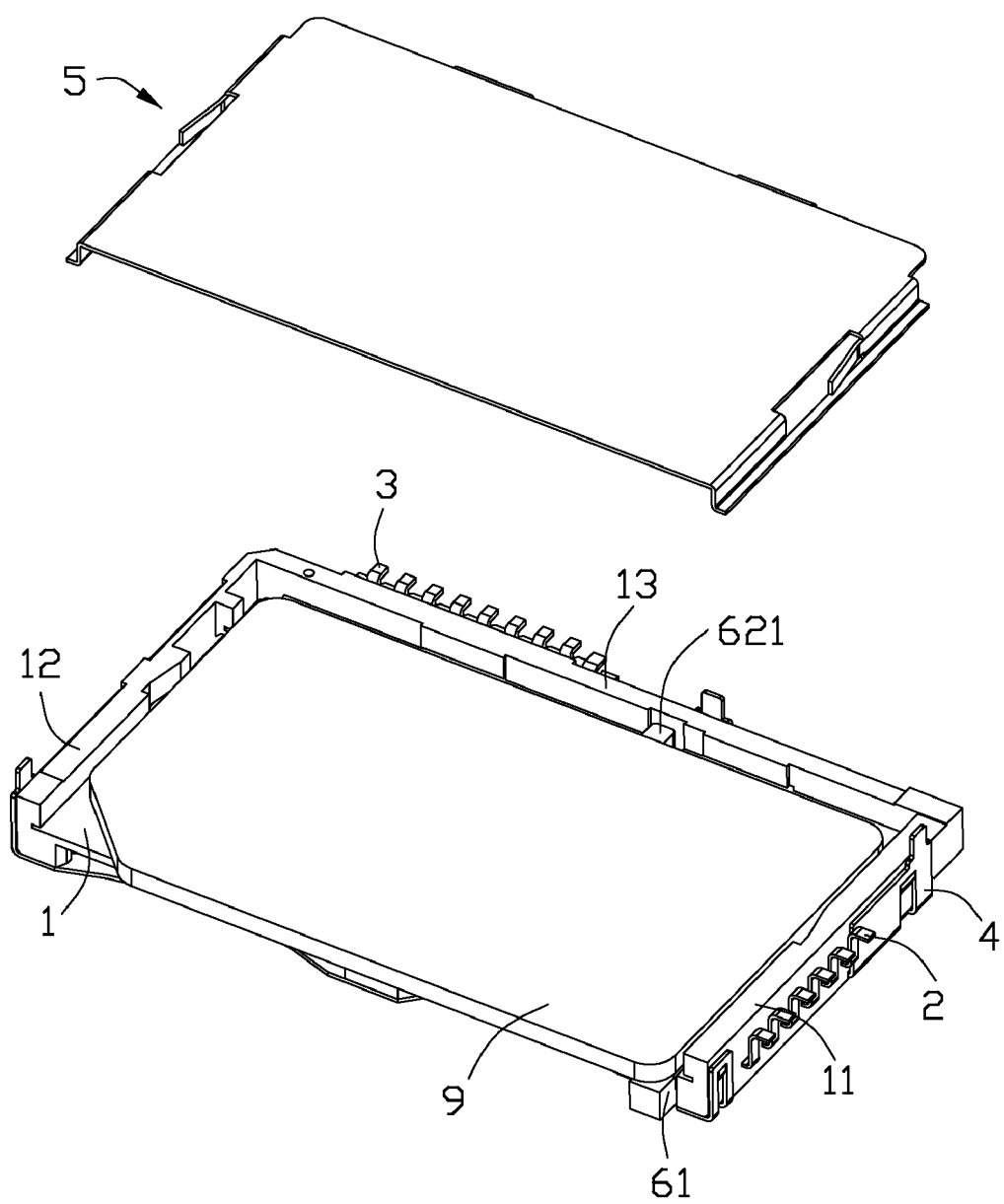
FIG. 5 is a perspective, partly exploded view of the card connector when the lower cover is separated from the insulative housing and a SIM card is inserted in a corresponding card receiving space.

Referring to FIGS. 1, 3 and 4, the first ejector 6 comprises an operating lever 61 and a pivoting shaft 62 actuated by the operating lever 61. The operating lever 61 is positioned in the receiving channel 105 and capable of moving along the card insertion direction. The operating lever 61 comprises an elongated bar portion 610, an operating portion 612 formed at a free end of the bar portion 610, a pushing bar 611 formed at the opposite end of the bar portion 610 relative to the operating portion 612, and a hook portion 613 laterally extending from the bar portion 610 towards the left receiving space 103. The pivoting shaft 62 comprises a strip portion 620, an actuated portion 622 formed at a first end of the strip portion 620 which couples to the pushing bar 611, and an ejecting portion 621 formed at a second end of the strip portion opposite to the actuated portion 622. The strip portion 620 defines an aperture 623 which receives the column portion 107 so that the pivoting shaft 62 may pivotally rotate around the column portion 107. The ejecting portion 621 extends downwardly from the strip portion 620 and archly moves in the arcuate slot 108. The ejecting portion 621 extends into the first receiving space 102 for ejecting the SIM card 9.

Referring to FIG. 3, the second ejector 7 is assembled on the right wall 12 and sideways located at the right receiving space 101. The second ejector 7 comprises a slider 70, a spring member 72, and a slider pin 73 cooperatively for positioning and ejecting the micro SD card. The second ejector 7 is a push-push type of ejector, which is well-known to persons skilled in the art, and it will not be described in detail herein. The card connector 100 further comprises a card lock 71 for securing the micro SD card, which is located in front of the second ejector 7.

When the SIM card 9 is inserted into the first receiving space 102, the SIM card 9 pushes the ejecting portion 621 of the pivoting shaft 62, the ejecting portion 621 moves in the arcuate slot 108 and towards the rear wall 13, the pivoting shaft 62 rotates around the column portion 107, and the actuated portion 622 pushes the operating lever 61 to move along the card ejection direction. When the SIM card 9 is fully inserted, the hook portion 613 of the operating lever 61 is stopped by the protrusion 104 for preventing the operating lever 61 from further moving along the card ejection direction.

When the SIM card 9 is ejected from the first receiving space 102 by pushing the operating lever 61 along the card insertion direction, the operating lever 61 actuates the pivoting shaft 62 to move around the column portion 107, the ejecting portion 621 of the pivoting shaft 62 moves away from the rear wall 13 in the arcuate slot 108, and the ejecting portion 621 ejects the SIM card 9 out of the first receiving space 102. When the SIM card 9 is ejected at a right position, the operating portion 612 of the operating lever 61 engages with the stop portion 151 for preventing further movement of the operating lever 61 along the card insertion direction.

In the present invention, the base portion 10, the left wall 11, the right wall 12, the rear wall 13, and the lower cover 5 cooperatively define the first card receiving space 102 for receiving the SIM card 9. The base portion 10, the barrier portion 14, the right wall 12, the rear wall 13, and the upper cover 4 cooperatively define the second card receiving space 101 for receiving the micro SD card. The second card receiving space 101 refers to the right receiving space 101. The base portion 10, the barrier portion 14, the left wall 11, the rear wall 13, and the upper cover 4 cooperatively define the left or third receiving space 103 for assembling the first ejector 6. The first ejector 6 of the present invention utilizes the left or third receiving space 103 beside the second card receiving space 101, with the ejecting portion 621 extending into the first card receiving space 102 to eject the SIM card 9, and accordingly, provision of the first ejector 6 does not increase the height of the stacked card connector 100.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector for receiving two cards, comprising:
an insulative housing comprising a base portion, a left wall, a right wall and a rear wall, the insulative housing further comprising a barrier portion;
a lower cover being disposed at one side of the insulative housing, the lower cover cooperating with the base portion, the left wall, the right wall, and the rear wall to form a first card receiving space defining a front-to-back card insertion direction;

an upper cover being disposed at an opposite side of the insulative housing, the upper cover cooperating with the base portion, the barrier portion, the right wall, and the rear wall to define a second card receiving space, the upper cover cooperating with the base portion, the left wall, the barrier portion, and the rear wall to define a third receiving space;

a plurality of first contacts and a plurality of second contacts retained in the insulative housing and respectively extending into the first card receiving space and the second card receiving space for contacting the two cards; and an ejector assembled in the third receiving space and comprising an ejecting portion extending into the first card receiving space for ejecting one of the two cards.

2. The card connector as claimed in claim 1, wherein the second card receiving space and the third receiving space are located at opposite sides of the barrier portion.

3. The card connector as claimed in claim 2, wherein the insulative housing defines a slot extending therethrough and communicating with the first card receiving space and the third receiving space.

4. The card connector as claimed in claim 3, wherein the slot is located adjacent to the barrier portion and gradually moves farther away from the barrier portion along a card ejection direction.

5. The card connector as claimed in claim 2, wherein the ejector comprises an operating lever and a pivoting shaft coupling to the operating lever and the ejecting portion is formed on the pivoting shaft.

6. The card connector as claimed in claim 5, wherein the insulative housing forms a column portion extending into the third receiving space and the pivoting shaft defines an aperture receiving the column portion.

7. The card connector as claimed in claim 5, wherein the insulative housing defines a receiving channel in the third receiving space, and the operating lever is received in the receiving channel.

8. The card connector as claimed in claim 7, wherein the insulative housing forms a plurality of protrusions adjacent to the left wall and the receiving channel is defined between the protrusions and the left wall.

9. The card connector as claimed in claim 8, wherein the protrusions are spaced same distances away from the left wall.

10. The card connector as claimed in claim 9, wherein the insulative housing forms a front wall connecting to the barrier portion and blocking insertion of a card into the third receiving space.

11. The card connector as claimed in claim 10, wherein the front wall forms a stop portion which is located adjacent to and spaces the same distance away from the left wall as the protrusions.

12. The card connector as claimed in claim 11, wherein the operating lever comprises an operating portion for engaging with the stop portion when the card is fully ejected.

13. The card connector as claimed in claim 8, wherein the operating lever comprises a bar portion received in the receiving channel and a hook portion laterally extending from the bar portion, and the hook portion is prevented by one of the protrusions from a further outward movement when a card is fully inserted.

14. The card connector as claimed in claim 1, further comprising a second ejector assembled on the right wall and sideways located at the second card receiving space.

15. The card connector as claimed in claim 1, wherein the insulative housing is elongated along a right-to-left direction perpendicular to the front-to-rear direction.

16. A card connector assembly comprising:

an insulative housing defining opposite first and second faces and equipped with first and second sets of contacts with contacting sections exposed upon said opposite first and second faces, respectively;

a first cover and a second cover assembled upon said opposite first and second faces, respectively, and cooperating with said housing to define opposite first and second card receiving spaces for receiving different first and second cards, respectively; and an ejector assembled on the first face of the insulative housing and having an ejecting portion extending into the second face of the insulative housing.

17. The card connector assembly as claimed in claim 16, wherein the second card has only one half size of said first card.

18. The card connector assembly as claimed in claim 17, wherein the first set of contacts coupling to the first card, extend oblique in a top view.

* * * * *